(12) United States Patent
Johnson (10) Patent No.: US 7,522,517 B1
(45) Date of Patent: Apr. 21, 2009

(54) COMMUNICATION SYSTEM WITH MULTIPOINT CIRCUIT BONDING

(75) Inventor: Harold W. Johnson, Roach, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 1302 days.

(21) Appl. No.: 10/715,619

(22) Filed: Nov. 18, 2003

(51) Int. Cl.
*G06F 11/00* (2006.01)

(52) U.S. Cl. .................................. 370/225; 370/221

(58) Field of Classification Search ................ 370/217, 370/218, 219, 220, 221, 222, 223, 224, 225, 370/226, 227, 228
See application file for complete search history.

(56) References Cited

U.S. PATENT DOCUMENTS

| | | | | |
|---|---|---|---|---|
| 5,490,252 | A * | 2/1996 | Macera et al. | 709/249 |
| 5,920,546 | A * | 7/1999 | Hebert et al. | 370/260 |
| 5,923,643 | A * | 7/1999 | Higgins et al. | 370/218 |
| 6,530,032 | B1 * | 3/2003 | Shew et al. | 714/4 |
| 6,639,893 | B1 * | 10/2003 | Chikenji et al. | 370/217 |
| 6,657,951 | B1 * | 12/2003 | Carroll et al. | 370/222 |
| 7,260,059 | B2 * | 8/2007 | Grover et al. | 370/222 |
| 7,355,965 | B2 * | 4/2008 | Griswold et al. | 370/216 |
| 7,385,919 | B2 * | 6/2008 | Koestner et al. | 370/222 |
| 2001/0038633 | A1 * | 11/2001 | Robertson et al. | 370/412 |
| 2002/0112072 | A1 * | 8/2002 | Jain | 709/239 |
| 2005/0163043 | A1 * | 7/2005 | Barthel et al. | 370/218 |
| 2007/0121579 | A1 * | 5/2007 | Matthews et al. | 370/351 |
| 2007/0212069 | A1 * | 9/2007 | Heinz et al. | 398/58 |

* cited by examiner

*Primary Examiner*—Chi H. Pham
*Assistant Examiner*—Kevin Mew (57) ABSTRACT

A communication system comprises: a first circuit bonding device, a second circuit bonding device, a third circuit bonding device, first bonded circuits coupling the first circuit bonding system and the second circuit bonding system, second bonded circuits coupling the first circuit bonding system and the third circuit bonding system, and third bonded circuits coupling the second circuit bonding device and the third circuit bonding device.

18 Claims, 5 Drawing Sheets

COMMUNICATION SYSTEM WITH MULTIPOINT CIRCUIT BONDING

RELATED APPLICATIONS

Not applicable

FEDERALLY SPONSORED RESEARCH OR DEVELOPMENT

Not applicable

MICROFICHE APPENDIX

Not applicable

BACKGROUND OF THE INVENTION

1. Field of the Invention

The invention is related to the field of communications, and in particular, to multipoint communication systems that use circuit bonding.

2. Description of the Prior Art

Circuit bonding devices exchange communications with their respective users. The communications may be in Ethernet, Internet Protocol, Storage Area Network, Time Division Multiplex, or some other communication format. Circuit bonding devices concatenate the user communications for transfer over bonded circuits. Circuit bonding devices receive the transferred user communications from the bonded circuits and de-concatenate the user communications for transfer to the users—typically in their original communication format. The circuits that are bonded together typically comprise unbundled network elements, such as twisted pairs, DS1 links, or DS3 links, that are obtained from Incumbent Local Exchange Carriers at wholesale rates pursuant to Federal rules. One example of a conventional circuit bonding device is the equipment provided by Ceterus Networks.

Conventional circuit bonding devices are deployed in pairs to provide point-to-point communications between the two circuit bonding devices that form the pair. If user site A must communicate with user site B and user site C, then a first pair of circuit bonding devices are required for the site A-to-B communications, and a second pair of circuit bonding devices are required for the site A-to-C communications. Thus, site A must install two circuit bonding devices to support communications to the two different sites B and C.

Unfortunately, the number of separate circuit bonding devices required per site in a multipoint communication system adds too much complexity and cost. In addition, conventional circuit bonding devices are not configured to effectively handle faults and traffic bursts in a multipoint communication system.

SUMMARY OF THE INVENTION

Examples of the invention include communication systems and their methods of operation. In some examples of the invention, a communication system comprises: a first circuit bonding device, a second circuit bonding device, a third circuit bonding device, first bonded circuits coupling the first circuit bonding system and the second circuit bonding system, second bonded circuits coupling the first circuit bonding system and the third circuit bonding system, and third bonded circuits coupling the second circuit bonding device and the third circuit bonding device. The first circuit bonding device is configured to receive first communications from a first user and transfer the first communications over the first bonded circuits to the second circuit bonding device and receive second communications from the first user and transfer the second communications over the second bonded circuits to the third circuit bonding device. The second circuit bonding device is configured to receive third communications from a second user and transfer the third communications over the first bonded circuits to the first circuit bonding device and receive fourth communications from the second user and transfer the fourth communications over the third bonded circuits to the third circuit bonding device. The third circuit bonding device is configured to receive fifth communications from a third user and transfer the fifth communications over the second bonded circuits to the first circuit bonding device and receive sixth communications from the third user and transfer the sixth communications over the third bonded circuits to the second circuit bonding device. The first circuit bonding device is configured to receive the third communications from the first bonded circuits and transfer the third communications to the first user and receive the fifth communications from the second bonded circuits and transfer the fifth communications to the first user. The second circuit bonding device is configured to receive the first communications from the first bonded circuits and transfer the first communications to the second user and receive the sixth communications from the third bonded circuits and transfer the sixth communications to the second user. The third circuit bonding device is configured to receive the second communications from the second bonded circuits and transfer the second communications to the third user and receive the fourth communications from the third bonded circuits and transfer the fourth communications to the third user.

In some examples of the invention, a fault occurs on the second bonded circuits. The first circuit bonding device is configured to automatically transfer the second communications over the first bonded circuits to the second circuit bonding device in response to the fault. The second circuit bonding device is configured to automatically receive the second communications from the first bonded circuits and transfer the second communications over the third bonded circuits to the third circuit bonding device in response to the fault. The third circuit bonding device is configured to automatically receive the second communications from the third bonded circuits in response to the fault. The third circuit bonding device is configured to automatically transfer the fifth communications over the third bonded circuits to the second circuit bonding device in response to the fault. The second circuit bonding device is configured to automatically receive the fifth communications from the third bonded circuits and transfer the fifth communications over the first bonded circuits to the first circuit bonding device in response to the fault. The first circuit bonding device is configured to automatically receive the fifth communications from the first bonded circuits in response to the fault. The first circuit bonding device and the second circuit bonding device are configured to automatically reallocate bandwidth on the first bonded circuits from the first communications to the second communications in response to the fault. The second circuit bonding device and the third circuit bonding device are configured to automatically reallocate bandwidth on the third bonded circuits from the fourth communications to the second communications in response to the fault. In some examples of the invention, the first user requires a traffic burst to the third user. The first circuit bonding device is configured to receive seventh communications for the traffic burst from the first user and automatically transfer the seventh communications over the first bonded circuits to the second circuit bonding device in response to the traffic burst. The second circuit bonding device is configured to automatically receive the seventh communications from the first bonded circuits and transfer the seventh communications over the third bonded circuits to the third circuit bonding device in response to the traffic burst. The third circuit bonding device is configured to automatically receive the seventh communications from the third bonded circuits and transfer the seventh communications to the third user in response to the traffic burst. The first circuit bonding device and the second circuit bonding device are configured to automatically reallocate bandwidth on the first bonded circuits from the first communications to the seventh communications in response to the traffic burst. The second circuit bonding device and the third circuit bonding device are configured to automatically reallocate bandwidth on the third bonded circuits from the fourth communications to the seventh communications in response to the traffic burst.

In some examples of the invention, the communication system further comprises a bonding device control system that is configured to receive user commands, and in response to the user commands, to transfer a first device command to the first circuit bonding device, transfer a second device command to the second circuit bonding device, and transfer a third device command to the third circuit bonding device. The first circuit bonding device is configured to receive the first device command, and in response, to receive seventh communications from the first user and transfer the seventh communications over the first bonded circuits to the second circuit bonding device. The second circuit bonding device is configured to receive the second device command, and in response, to receive the seventh communications from the first bonded circuits and transfer the seventh communications over the third bonded circuits to the third circuit bonding device. The third circuit bonding device is configured to receive the third device command, and in response, to receive the seventh communications from the third bonded circuits and transfer the seventh communications to the third user. The first circuit bonding device and the second circuit bonding device are configured to reallocate bandwidth on the first bonded circuits from the first communications to the seventh communications in response to the first device command and the second device command. The second circuit bonding device and the third circuit bonding device are configured to reallocate bandwidth on the third bonded circuits from the fourth communications to the seventh communications in response to the second device command and the third device command.

In some examples of the invention, the first bonded circuits, the second bonded circuits, and the third bonded circuits comprise unbundled network elements.

In some examples of the invention, the first communications received from the first user into the first circuit bonding device and transferred from the second circuit bonding device to the second user comprise Ethernet communications. The second communications received from the first user into the first circuit bonding device and transferred from the third circuit bonding device to the third user comprise Ethernet communications. The third communications received from the second user into the second circuit bonding device and transferred from the first circuit bonding device to the first user comprise Ethernet communications. The fourth communications received from the second user into the second circuit bonding device and transferred from the third circuit bonding device to the third user comprise Ethernet communications. The fifth communications received from the third user into the third circuit bonding device and transferred from the first circuit bonding device to the first user comprise Ethernet communications. The sixth communications received from the third user into the third circuit bonding device and transferred from the second circuit bonding device to the second user comprise Ethernet communications.

BRIEF DESCRIPTION OF THE DRAWINGS

The same reference number represents the same element on all drawings.

DETAILED DESCRIPTION OF THE PREFERRED EMBODIMENT

FIGS. 1-5 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
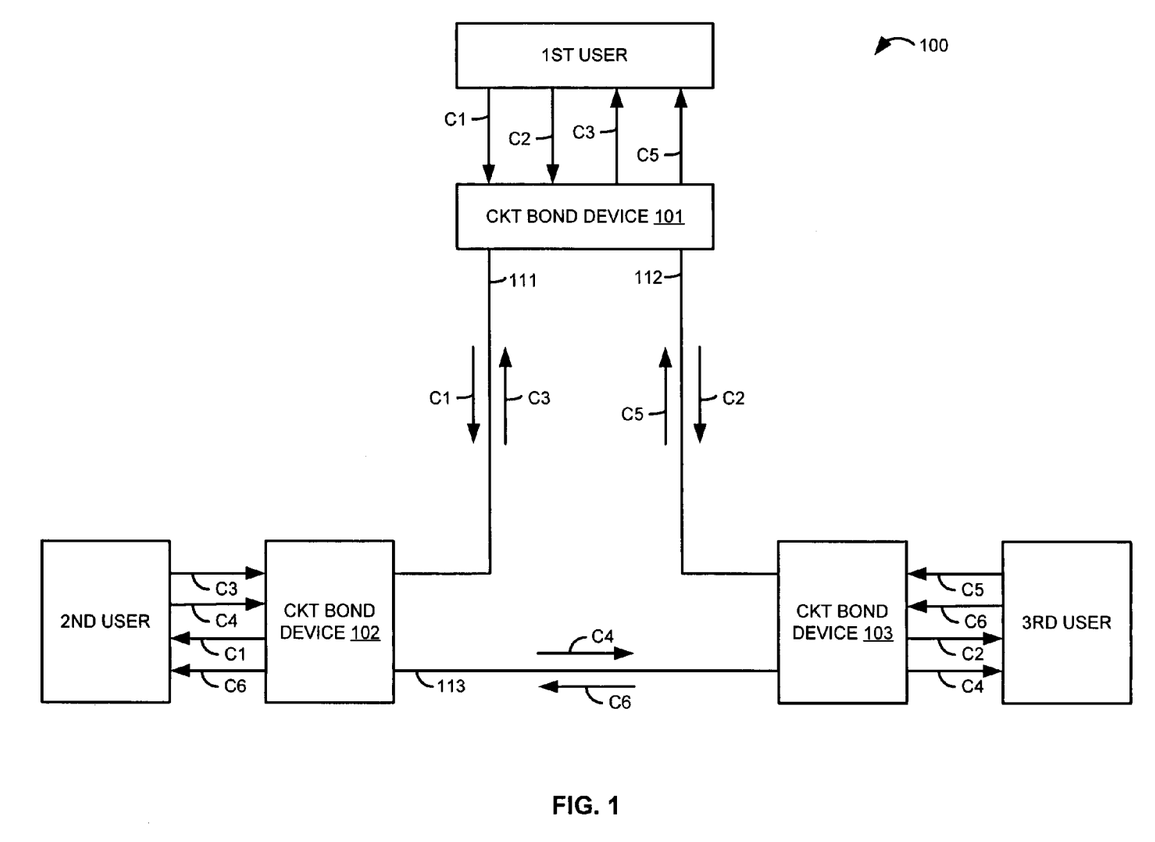
FIG. 1 illustrates a communication system in an example of the invention.

FIG. 1 illustrates communication system 100 in an example of the invention. Communication system 100 includes a first circuit bonding device 101, second circuit bonding device 102, and a third circuit bonding device 103. Communication system 100 includes first bonded circuits 111 coupling circuit bonding system 101 and circuit bonding system 102. Communication system 100 includes second bonded circuits 112 coupling circuit bonding system 101 and circuit bonding system 103. Communication system 100 includes third bonded circuits 113 coupling circuit bonding device 102 and circuit bonding device 103.

Circuit bonding devices 101-103 exchange communications with their respective users. The communications may be in Ethernet, Internet Protocol, Storage Area Network, Time Division Multiplex, or some other communication format. Circuit bonding devices 101-103 concatenate the user communications for transfer over bonded circuits 111-113. Circuit bonding devices 101-103 receive the transferred user communications from bonded circuits 111-113 and de-concatenate the user communications for transfer to the users—typically in their original communication format. The circuits that are bonded together typically comprise unbundled network elements, such as twisted pairs, DS1 links, or DS3 links, that are obtained from Incumbent Local Exchange Carriers at wholesale rates pursuant to Federal rules. Bonded circuits 111-113 could comprise a metropolitan area network or a wide area network. Based on this disclosure, conventional circuit bonding equipment provided by Ceterus Networks could be adapted by those skilled in the art to make circuit bonding devices 101-103.

In operation, circuit bonding device 101 receives first communications (C1) from a first user and transfers the first communications over bonded circuits 111 to circuit bonding device 102. Circuit bonding device 101 receives second communications (C2) from the first user and transfers the second communications over bonded circuits 112 to circuit bonding device 103.

Circuit bonding device 102 receives third communications (C3) from a second user and transfers the third communications over bonded circuits 111 to circuit bonding device 101. Circuit bonding device 102 receives fourth communications (C4) from the second user and transfers the fourth communications over bonded circuits 113 to circuit bonding device 103.

Circuit bonding device 103 receives fifth communications (C5) from a third user and transfers the fifth communications over bonded circuits 112 to circuit bonding device 101. Circuit bonding device 103 receives sixth communications (C6) from the third user and transfers the sixth communications over bonded circuits 113 to circuit bonding device 102.

Circuit bonding device 101 receives the third communications from bonded circuits 111 and transfers the third communications to the first user. Circuit bonding device 101 receives the fifth communications from bonded circuits 112 and transfers the fifth communications to the first user.

Circuit bonding device 102 receives the first communications from bonded circuits 111 and transfers the first communications to the second user. Circuit bonding device 102 receives the sixth communications from bonded circuits 113 and transfers the sixth communications to the second user.

Circuit bonding device 103 receives the second communications from bonded circuits 112 and transfers the second communications to the third user. Circuit bonding device 103 receives the fourth communications from bonded circuits 113 and transfers the fourth communications to the third user.

Figure 2:
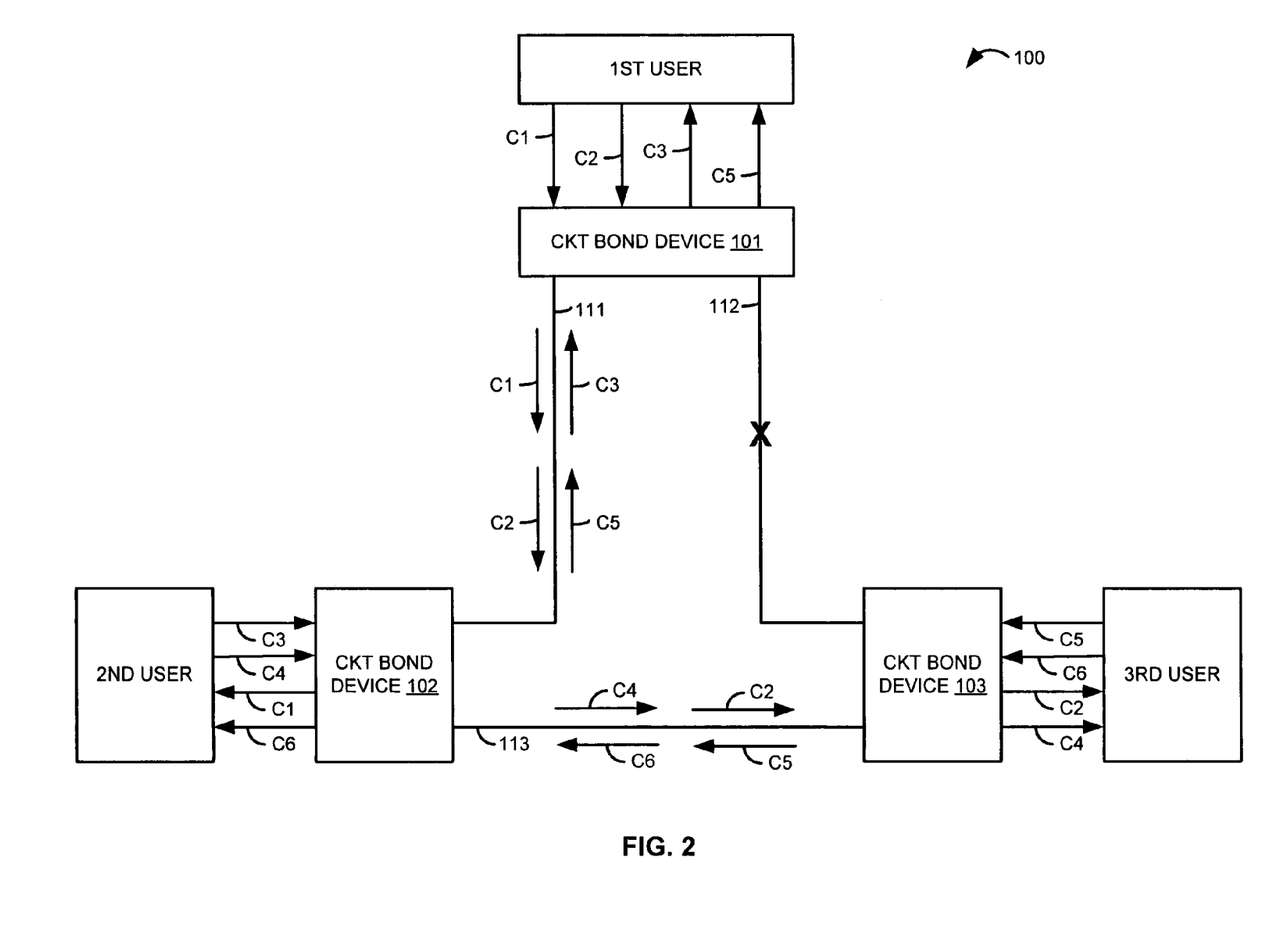
FIG. 2 illustrates fault protection in the communication system in an example of the invention.

FIG. 2 illustrates fault protection in communication system 100 in an example of the invention. Consider the above example of FIG. 1, but with a fault occurring on bonded circuits 112, which is indicated on FIG. 2 by an X. The fault could be an optical fiber cut, unacceptable error rates, unacceptable latency, or some other event that severely diminishes communication service. Circuit bonding device 101 and/or 102 would sense the fault and notify the other circuit bonding devices 101-103.

In response to the fault, circuit bonding device 101 automatically transfers the second communications (C2) over bonded circuits 111 to circuit bonding device 102. In response to the fault, circuit bonding device 102 automatically receives the second communications from bonded circuits 111 and transfers the second communications over bonded circuits 113 to circuit bonding device 103. In response to the fault, bonding device 103 automatically receives the second communications from bonded circuits 113.

In response to the fault, circuit bonding device 103 automatically transfers the fifth communications (C5) over bonded circuits 113 to circuit bonding device 102. In response to the fault, circuit bonding device 102 automatically receives the fifth communications from bonded circuits 113 and transfers the fifth communications over bonded circuits 111 to circuit bonding device 101. In response to the fault, circuit bonding device 101 automatically receives the fifth communications from bonded circuits 111.

To facilitate re-routing in response to the fault, circuit bonding devices 101-102 may automatically reallocate bandwidth on bonded circuits 111 from the first communications to the second communications in response to the fault. Circuit bonding devices 102-103 may automatically reallocate bandwidth on bonded circuits 113 from the fourth communications to the second communications in response to the fault.

Thus, communication system 100 automatically senses the fault and re-routes the affected communications over alternate bonded circuits through an intermediate circuit bonding device. If desired, bandwidth allocation adjustments are made to facilitate the re-routing of traffic away from the fault.

Figure 3:
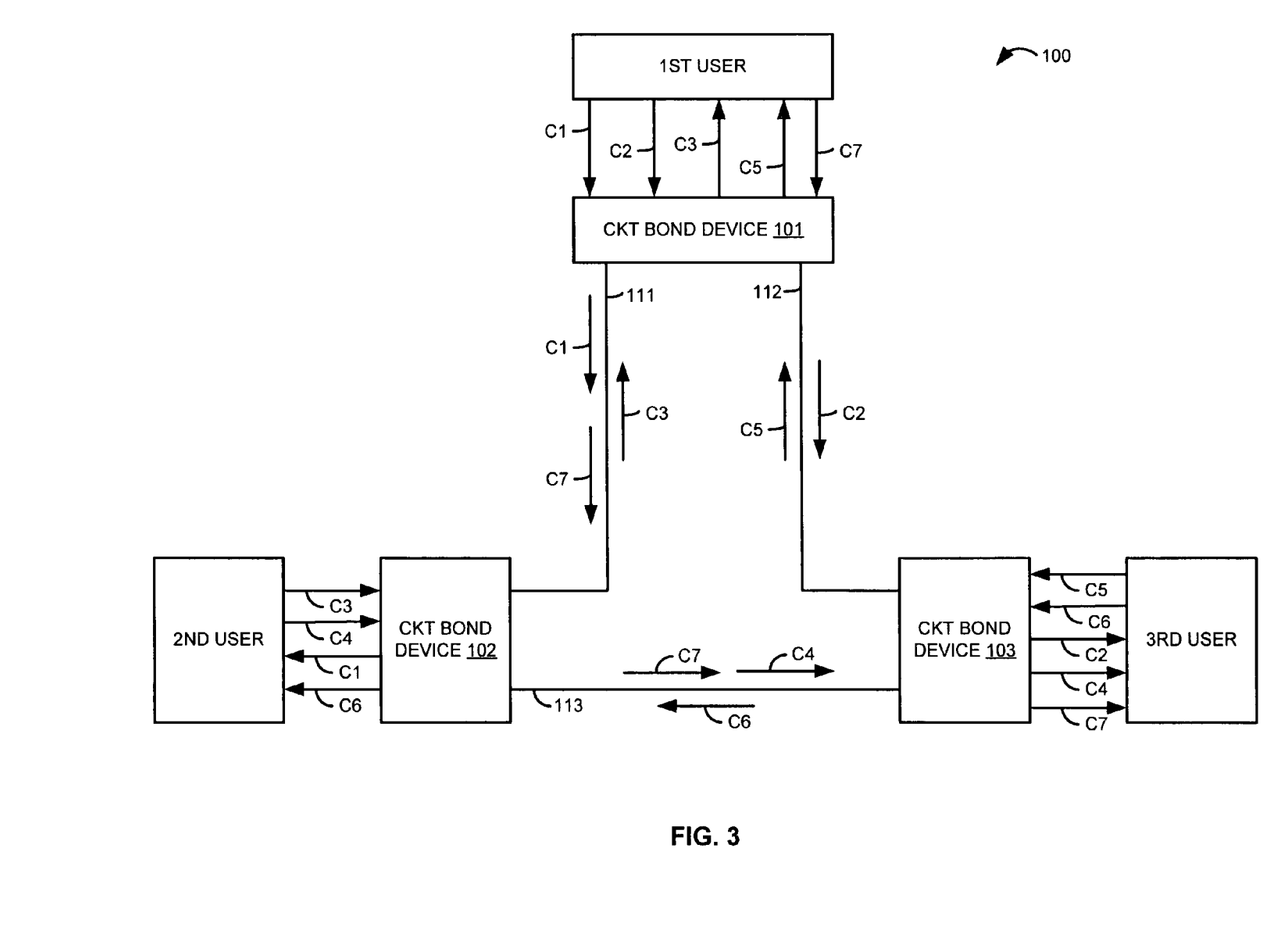
FIG. 3 illustrates traffic burst handling in the communication system in an example of the invention.

FIG. 3 illustrates traffic burst handling in communication system 100 in an example of the invention. A traffic burst is an excess amount of communications transferred from one user to another during a given time period. Consider the above example of FIG. 1, but with a traffic burst from the first user to the third user. The traffic burst is indicated on FIG. 3 by the seventh communications (C7) transferred from the first user to circuit bonding device 101. Circuit bonding device 101 would sense the traffic burst and notify the other circuit bonding devices 101-103.

In response to the traffic burst, circuit bonding device 101 receives the seventh communications from the first user and automatically transfers the seventh communications over bonded circuits 111 to circuit bonding device 102. In response to the traffic burst, circuit bonding device 102 automatically receives the seventh communications from bonded circuits 111 and transfers the seventh communications over bonded circuits 113 to circuit bonding device 103. In response to the traffic burst, bonding device 103 automatically receives the seventh communications from bonded circuits 113 and transfers the seventh communications to the third user.

To facilitate re-routing in response to the traffic burst, circuit bonding devices 101-102 may automatically reallocate bandwidth on bonded circuits 111 from the first communications to the seventh communications in response to the traffic burst. Circuit bonding devices 102-103 may automatically reallocate bandwidth on bonded circuits 113 from the fourth communications to the seventh communications in response to the traffic burst.

Thus, communication system 100 automatically senses the traffic burst and routes the excess communications over alternate bonded circuits through an intermediate circuit bonding device. If desired, bandwidth allocation adjustments are made to facilitate the re-routing of traffic to accommodate the burst. Alternatively, the fifth communications (C5) could have been re-routed off of bonded circuits 112 and on to bonded circuits 111 and 113 through circuit bonding device 102, so the seventh communications could have used bonded circuits 112.

Figure 4:
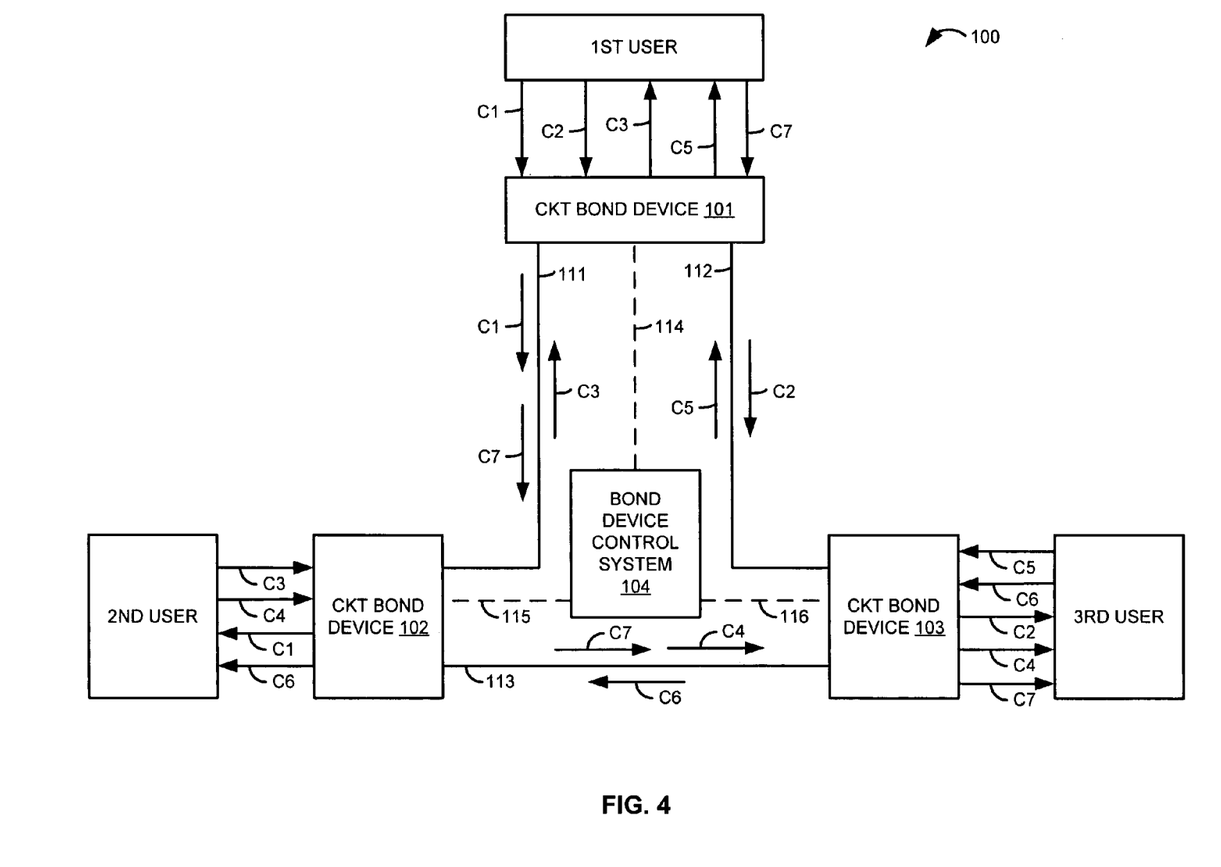
FIG. 4 illustrates user control over the communication system in an example of the invention.

FIG. 4 illustrates user control over communication system 100 in an example of the invention. Consider the above example of FIG. 1, but with the addition of bonding device control system 104 that is linked to circuit bonding devices 101-103 by respective links 114-116. Control system 104 receives user commands, and in response to the user commands, transfers a first device command to first circuit bonding device 101 over link 114, transfers a second device command to circuit bonding device 102 over link 115, and transfers a third device command to circuit bonding device 103 over link 116.

In response to the first device command, circuit bonding device 101 receives seventh communications (C7) from the first user and automatically transfers the seventh communications over bonded circuits 111 to circuit bonding device 102. In response to the second device command, circuit bonding device 102 automatically receives the seventh communications from bonded circuits 111 and transfers the seventh communications over bonded circuits 113 to circuit bonding device 103. In response to the third device command, bonding device 103 automatically receives the seventh communications from bonded circuits 113 and transfers the seventh communications to the third user.

To facilitate routing in response to the user commands, circuit bonding devices 101-102 may automatically reallocate bandwidth on bonded circuits 111 from the first communications to the seventh communications in response to the first and second device commands. Circuit bonding devices 102-103 may automatically reallocate bandwidth on bonded circuits 113 from the fourth communications to the seventh communications in response to the second and third device commands.

Control system 104 could be centralized in a single device or distributed among multiple devices. Control system 104 could be integrated within one or more of circuit bonding devices 101-103 or could be separate from circuit bonding devices 101-103. Control system 104 could also be used in the above fault and burst examples to sense the fault or burst, and coordinate and control the re-routing in response to the fault or burst.

Control system 104 could provide a display of communication system 100 similar to FIG. 1. The user could control communication system 100 by entering user commands onto the display. The user may modify the routing of particular communications. The user may also modify the bandwidth that is allocated to particular communications. Control system 104 could also execute a program that controls communication system 100 based on many factors such as time of day, day of week, and day of year. For example, bandwidth for employee communications could be decreased at night, so communications for data back-up operations could be increased.

It should be appreciated that communication system 100 dynamically controls routing and bandwidth allocation across the bonded circuits and devices. The dynamic control can handle fault and burst conditions, in addition to better matching available bandwidth to communication requirements. This allows traffic overbooking to enable statistical gain in bandwidth utilization.

Figure 5:
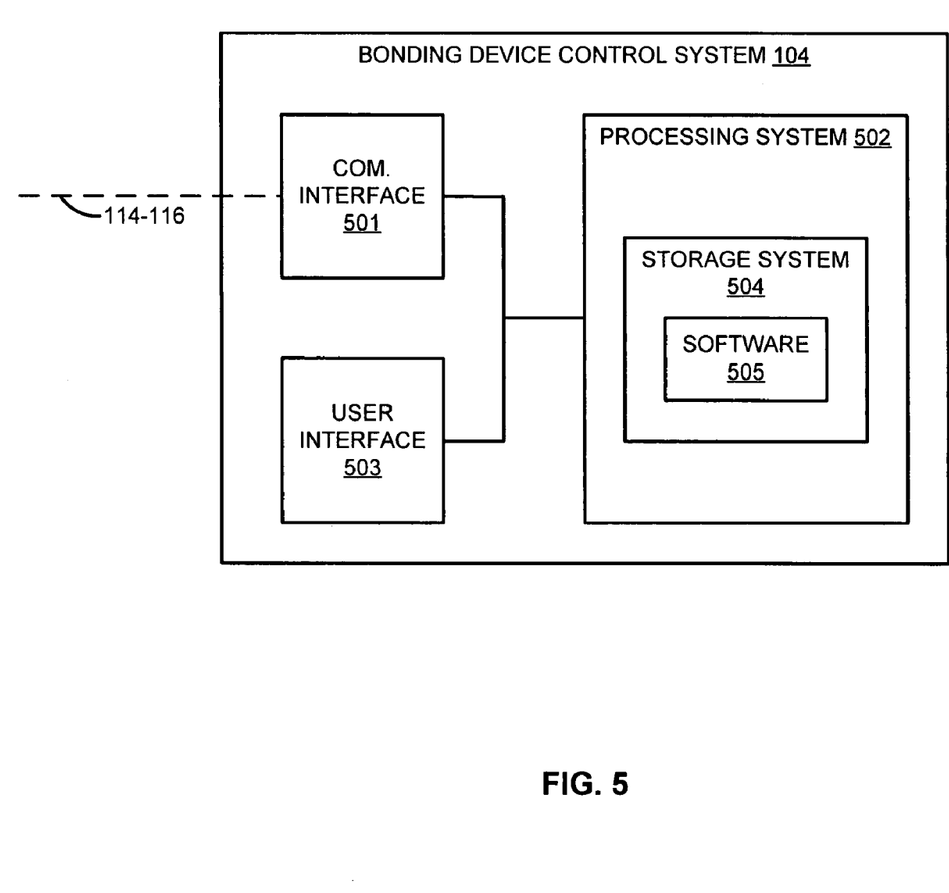
FIG. 5 illustrates a bonding device control system in an example of the invention.

FIG. 5 illustrates bonding device control system 104 in an example of the invention. Control system 104 includes communication interface 501, processing system 502, and user interface 503. Processing system 502 includes storage system 504. Storage system 504 stores software 505. Processing system 502 is linked to communication interface 501 and user interface 503. Communication interface 501 is coupled to links 114-116.

Control system 104 could be comprised of a programmed general-purpose computer, although those skilled in the art will appreciate that programmable or special purpose circuitry and equipment may be used. Control system 104 may use a client server architecture where operations are distributed among a server system and client devices that together comprise elements 501-505.

Communication interface 501 could comprise a network interface card, modem, port, or some other communication device. Communication interface 501 may be distributed among multiple communication devices. Processing system 502 could comprise a computer microprocessor, logic circuit, or some other processing device. Processing system 502 may be distributed among multiple processing devices. User interface 503 could comprise a keyboard, mouse, voice recognition interface, microphone and speakers, graphical display, touch screen, or some other type of user device. Storage system 504 could comprise a disk, tape, integrated circuit, server, or some other memory device. Storage system 504 may be distributed among multiple memory devices.

Processing system 502 retrieves and executes software 505 from storage system 504. Software 505 may comprise an operating system, utilities, drivers, networking software, and other software typically loaded onto a general-purpose computer. Software 505 could comprise an application program, firmware, or some other form of machine-readable processing instructions. When executed by processing system 502, software 505 directs processing system 502 to operate as described herein.

The invention claimed is:

1. A communication system comprising:
a first circuit bonding device;
a second circuit bonding device;
a third circuit bonding device;
first bonded circuits coupling the first circuit bonding system and the second circuit bonding system;
second bonded circuits coupling the first circuit bonding system and the third circuit bonding system;
third bonded circuits coupling the second circuit bonding device and the third circuit bonding device;
the first circuit bonding device configured to receive first communications from a first user and transfer the first communications over the first bonded circuits to the second circuit bonding device and receive second communications from the first user and transfer the second communications over the second bonded circuits to the third circuit bonding device;
the second circuit bonding device configured to receive third communications from a second user and transfer the third communications over the first bonded circuits to the first circuit bonding device and receive fourth communications from the second user and transfer the fourth communications over the third bonded circuits to the third circuit bonding device;
the third circuit bonding device configured to receive fifth communications from a third user and transfer the fifth communications over the second bonded circuits to the first circuit bonding device and receive sixth communications from the third user and transfer the sixth communications over the third bonded circuits to the second circuit bonding device;
the first circuit bonding device configured to receive the third communications from the first bonded circuits and transfer the third communications to the first user and receive the fifth communications from the second bonded circuits and transfer the fifth communications to the first user;
the second circuit bonding device configured to receive the first communications from the first bonded circuits and transfer the first communications to the second user and receive the sixth communications from the third bonded circuits and transfer the sixth communications to the second user; and
the third circuit bonding device configured to receive the second communications from the second bonded circuits and transfer the second communications to the third user and receive the fourth communications from the third bonded circuits and transfer the fourth communications to the third user;
wherein if a fault occurs on the second bonded circuits, the first circuit bonding device is configured to automatically transfer the second communications over the first bonded circuits to the second circuit bonding device in response to the fault, the second circuit bonding device is configured to automatically receive the second communications from the first bonded circuits and transfer the second communications over the third bonded circuits to the third circuit bonding device in response to the fault, and the third circuit bonding device is configured to automatically receive the second communications from the third bonded circuits in response to the fault.

2. The communication system of claim 1 wherein:
the third circuit bonding device is configured to automatically transfer the fifth communications over the third bonded circuits to the second circuit bonding device in response to the fault;
the second circuit bonding device is configured to automatically receive the fifth communications from the third bonded circuits and transfer the fifth communications over the first bonded circuits to the first circuit bonding device in response to the fault; and
the first circuit bonding device is configured to automatically receive the fifth communications from the first bonded circuits in response to the fault.

3. The communication system of claim 1 wherein:
the first circuit bonding device and the second circuit bonding device are configured to automatically reallocate bandwidth on the first bonded circuits from the first communications to the second communications in response to the fault; and
the second circuit bonding device and the third circuit bonding device are configured to automatically reallocate bandwidth on the third bonded circuits from the fourth communications to the second communications in response to the fault.

4. The communication system of claim 1 wherein if the first user requires a traffic burst to the third user:
the first circuit bonding device is configured to receive seventh communications for the traffic burst from the first user and automatically transfer the seventh communications over the first bonded circuits to the second circuit bonding device in response to the traffic burst;
the second circuit bonding device is configured to automatically receive the seventh communications from the first bonded circuits and transfer the seventh communications over the third bonded circuits to the third circuit bonding device in response to the traffic burst; and
the third circuit bonding device is configured to automatically receive the seventh communications from the third bonded circuits and transfer the seventh communications to the third user in response to the traffic burst.

5. The communication system of claim 4 wherein:
the first circuit bonding device and the second circuit bonding device are configured to automatically reallocate bandwidth on the first bonded circuits from the first communications to the seventh communications in response to the traffic burst; and
the second circuit bonding device and the third circuit bonding device are configured to automatically reallocate bandwidth on the third bonded circuits from the fourth communications to the seventh communications in response to the traffic burst.

6. The communication system of claim 1 further comprising:
a bonding device control system configured to receive user commands, and in response to the user commands, to transfer a first device command to the first circuit bonding device, transfer a second device command to the second circuit bonding device, and transfer a third device command to the third circuit bonding device; and wherein
the first circuit bonding device is configured to receive the first device command, and in response, to receive seventh communications from the first user and transfer the seventh communications over the first bonded circuits to the second circuit bonding device;
the second circuit bonding device is configured to receive the second device command, and in response, to receive the seventh communications from the first bonded circuits and transfer the seventh communications over the third bonded circuits to the third circuit bonding device; and
the third circuit bonding device is configured to receive the third device command, and in response, to receive the seventh communications from the third bonded circuits and transfer the seventh communications to the third user.

7. The communication system of claim 6 wherein:
the first circuit bonding device and the second circuit bonding device are configured to reallocate bandwidth on the first bonded circuits from the first communications to the seventh communications in response to the first device command and the second device command; and
the second circuit bonding device and the third circuit bonding device are configured to reallocate bandwidth on the third bonded circuits from the fourth communications to the seventh communications in response to the second device command and the third device command.

8. The communication system of claim 1 wherein the first bonded circuits, the second bonded circuits, and the third bonded circuits comprise unbundled network elements.

9. The communication system of claim 1 wherein:
the first communications received from the first user into the first circuit bonding device and transferred from the second circuit bonding device to the second user comprise Ethernet communications;
the second communications received from the first user into the first circuit bonding device and transferred from the third circuit bonding device to the third user comprise Ethernet communications;
the third communications received from the second user into the second circuit bonding device and transferred from the first circuit bonding device to the first user comprise Ethernet communications;
the fourth communications received from the second user into the second circuit bonding device and transferred from the third circuit bonding device to the third user comprise Ethernet communications;
the fifth communications received from the third user into the third circuit bonding device and transferred from the first circuit bonding device to the first user comprise Ethernet communications; and
the sixth communications received from the third user into the third circuit bonding device and transferred from the second circuit bonding device to the second user comprise Ethernet communications.

10. A method of operating a communication system comprising a first circuit bonding device, a second circuit bonding device, a third circuit bonding device, first bonded circuits coupling the first circuit bonding system and the second circuit bonding system, second bonded circuits coupling the first circuit bonding system and the third circuit bonding system, and third bonded circuits coupling the second circuit bonding device and the third circuit bonding device, the method comprising:
in the first circuit bonding device, receiving first communications from a first user and transferring the first communications over the first bonded circuits to the second circuit bonding device and receiving second communications from the first user and transferring the second communications over the second bonded circuits to the third circuit bonding device;

in the second circuit bonding device, receiving third communications from a second user and transferring the third communications over the first bonded circuits to the first circuit bonding device and receiving fourth communications from the second user and transferring the fourth communications over the third bonded circuits to the third circuit bonding device;

in the third circuit bonding device, receiving fifth communications from a third user and transferring the fifth communications over the second bonded circuits to the first circuit bonding device and receiving sixth communications from the third user and transferring the sixth communications over the third bonded circuits to the second circuit bonding device;

in the first circuit bonding device, receiving the third communications from the first bonded circuits and transferring the third communications to the first user and receiving the fifth communications from the second bonded circuits and transferring the fifth communications to the first user;

in the second circuit bonding device, receiving the first communications from the first bonded circuits and transferring the first communications to the second user and receiving the sixth communications from the third bonded circuits and transferring the sixth communications to the second user; and in the third circuit bonding device, receiving the second communications from the second bonded circuits and transferring the second communications to the third user and receiving the fourth communications from the third bonded circuits and transferring the fourth communications to the third user;

wherein if a fault occurs on the second bonded circuits, in the first circuit bonding device, automatically transferring the second communications over the first bonded circuits to the second circuit bonding device in response to the fault, in the second circuit bonding device, automatically receiving the second communications from the first bonded circuits and transferring the second communications over the third bonded circuits to the third circuit bonding device in response to the fault, and in the third circuit bonding device, automatically receiving the second communications from the third bonded circuits in response to the fault.

11. The method of claim 10 further comprising:

in the third circuit bonding device, automatically transferring the fifth communications over the third bonded circuits to the second circuit bonding device in response to the fault;

in the second circuit bonding device, automatically receiving the fifth communications from the third bonded circuits and transferring the fifth communications over the first bonded circuits to the first circuit bonding device in response to the fault; and in the first circuit bonding device, automatically receiving the fifth communications from the first bonded circuits in response to the fault.

12. The method of claim 10 further comprising:

in the first circuit bonding device and the second circuit bonding device, automatically reallocating bandwidth on the first bonded circuits from the first communications to the second communications in response to the fault; and in the second circuit bonding device and the third circuit bonding device, automatically reallocating bandwidth on the third bonded circuits from the fourth communications to the second communications in response to the fault.

13. The method of claim 10 wherein if the first user requires a traffic burst to the third user:

in the first circuit bonding device, receiving seventh communications for the traffic burst from the first user and automatically transferring the seventh communications over the first bonded circuits to the second circuit bonding device in response to the traffic burst;

in the second circuit bonding device, automatically receiving the seventh communications from the first bonded circuits and transferring the seventh communications over the third bonded circuits to the third circuit bonding device in response to the traffic burst; and in the third circuit bonding device, automatically receiving the seventh communications from the third bonded circuits and transferring the seventh communications to the third user in response to the traffic burst.

14. The method of claim 13 further comprising:

in the first circuit bonding device and the second circuit bonding device, automatically reallocating bandwidth on the first bonded circuits from the first communications to the seventh communications in response to the traffic burst; and in the second circuit bonding device and the third circuit bonding device, automatically reallocating bandwidth on the third bonded circuits from the fourth communications to the seventh communications in response to the traffic burst.

15. The method of claim 10 wherein the communication system further comprises a bonding device control system, further comprising in the bonding device control system, receiving user commands, and in response to the user commands, transferring a first device command to the first circuit bonding device, transferring a second device command to the second circuit bonding device, and transferring a third device command to the third circuit bonding device;

in the first circuit bonding device, receiving the first device command, and in response, receiving seventh communications from the first user and transferring the seventh communications over the first bonded circuits to the second circuit bonding device;

in the second circuit bonding device, receiving the second device command, and in response, receiving the seventh communications from the first bonded circuits and transferring the seventh communications over the third bonded circuits to the third circuit bonding device; and in the third circuit bonding device, receiving the third device command, and in response, receiving the seventh communications from the third bonded circuits and transferring the seventh communications to the third user.

16. The method of claim 15 further comprising:

in the first circuit bonding device and the second circuit bonding device, reallocating bandwidth on the first bonded circuits from the first communications to the seventh communications in response to the first device command and the second device command; and in the second circuit bonding device and the third circuit bonding device, reallocating bandwidth on the third bonded circuits from the fourth communications to the seventh communications in response to the second device command and the third device command.

17. The method of claim 10 wherein the first bonded circuits, the second bonded circuits, and the third bonded circuits comprise unbundled network elements.

18. The method of claim 10 wherein:

the first communications received from the first user into the first circuit bonding device and transferred from the second circuit bonding device to the second user comprise Ethernet communications;

the second communications received from the first user into the first circuit bonding device and transferred from the third circuit bonding device to the third user comprise Ethernet communications;

the third communications received from the second user into the second circuit bonding device and transferred from the first circuit bonding device to the first user comprise Ethernet communications;

the fourth communications received from the second user into the second circuit bonding device and transferred from the third circuit bonding device to the third user comprise Ethernet communications;

the fifth communications received from the third user into the third circuit bonding device and transferred from the first circuit bonding device to the first user comprise Ethernet communications; and the sixth communications received from the third user into the third circuit bonding device and transferred from the second circuit bonding device to the second user comprise Ethernet communications.

* * * * *